(12) United States Patent
Tyburcy et al.

(10) Patent No.: US 10,718,450 B2
(45) Date of Patent: Jul. 21, 2020

(54) FLANGE JOINT ASSEMBLY FOR USE IN A GAS TURBINE ENGINE

(71) Applicant: General Electric Company, Schenectady, NY (US)

(72) Inventors: Antoni Tyburcy, Warsaw (PL); Andrzej Kazimierz Kakolewski, Warsaw (PL); Kamil Rajter, Warsaw (PL)

(73) Assignee: General Electric Company, Schenectady, NY (US)

( * ) Notice: Subject to any disclaimer, the term of this patent is extended or adjusted under 35 U.S.C. 154(b) by 287 days.

(21) Appl. No.: 15/423,633

(22) Filed: Feb. 3, 2017

(65) Prior Publication Data
US 2017/0227152 A1  Aug. 10, 2017

(30) Foreign Application Priority Data
Feb. 4, 2016  (PL) .......................................... 416036

(51) Int. Cl.
*F01D 25/24* (2006.01)
*F16L 23/00* (2006.01)
(Continued)

(52) U.S. Cl.
CPC ............ *F16L 23/003* (2013.01); *F01D 25/12* (2013.01); *F01D 25/243* (2013.01); *F02C 7/32* (2013.01); *F02K 3/06* (2013.01); *F16L 23/02* (2013.01); *F05D 2220/32* (2013.01); *F05D 2230/642* (2013.01); *F05D 2240/55* (2013.01); (Continued)

(58) Field of Classification Search
CPC .......... F16L 23/003; F16L 23/02; F02K 3/06; F02C 7/32; F01D 25/243; F01D 25/12; F01D 25/246; Y02T 50/672; Y02T 50/675; F05D 2260/37; F05D 2240/55; (Continued)

(56) References Cited

U.S. PATENT DOCUMENTS 2,877,623 A * 3/1959 Klompas ............... F01D 25/243
415/119
4,679,981 A  7/1987 Guibert et al.
(Continued)

FOREIGN PATENT DOCUMENTS

CN    102563064 B    5/2015
EP    0 085 021 A1   8/1983
(Continued)

OTHER PUBLICATIONS

Combined Search and Examination Report issued in connection with corresponding GB Application No. 1701629.6 dated May 12, 2017.

*Primary Examiner* — Sarang Afzali
*Assistant Examiner* — Ruth G Hidalgo-Hernandez
(74) *Attorney, Agent, or Firm* — Hanley, Flight and Zimmerman, LLC

(57) ABSTRACT

A flange joint assembly includes a first structure including a first flange and a second structure including a second flange coupled to the first flange to form a joint therebetween. The second flange includes a radially outer surface. The flange joint assembly also includes a compression ring coupled to at least the radially outer surface and configured to apply a compressive force to the radially outer surface to reduce an amount of tension stress within said second flange.

16 Claims, 7 Drawing Sheets

(51) Int. Cl.
*F01D 25/12* (2006.01)
*F02C 7/32* (2006.01)
*F02K 3/06* (2006.01)
*F16L 23/02* (2006.01)

(52) U.S. Cl.
CPC ...... *F05D 2260/31* (2013.01); *F05D 2260/37* (2013.01); *F05D 2300/6033* (2013.01); *Y02T 50/672* (2013.01); *Y02T 50/675* (2013.01)

(58) Field of Classification Search
CPC ............ F05D 2260/31; F05D 2220/32; F05D 2300/6033; F05D 2230/642
See application file for complete search history.

(56) References Cited

U.S. PATENT DOCUMENTS

| | | | |
|---|---|---|---|
| 5,412,939 A | 5/1995 | Hover et al. | |
| 5,437,482 A | 8/1995 | Curtis | |
| 5,470,114 A | 11/1995 | Umney et al. | |
| 5,503,490 A * | 4/1996 | Melton | F01D 25/243 403/28 |
| 6,368,054 B1 | 4/2002 | Lucas | |
| 6,435,820 B1 * | 8/2002 | Overberg | F01D 25/246 415/1 |
| 7,665,962 B1 | 2/2010 | Liang | |
| 8,123,472 B2 | 2/2012 | Redgwell | |
| 8,794,910 B2 | 8/2014 | Gasmen et al. | |
| 2005/0200129 A1 | 9/2005 | Bongiomo | |

FOREIGN PATENT DOCUMENTS

| | | |
|---|---|---|
| EP | 0 333 919 A1 | 9/1989 |
| KR | 10-1134992 B1 | 4/2012 |
| PL | 181068 B1 | 5/2001 |
| WO | 2013/117195 A1 | 8/2013 |

* cited by examiner

FLANGE JOINT ASSEMBLY FOR USE IN A GAS TURBINE ENGINE

BACKGROUND

The application described herein relates generally to gas turbine engines, and more specifically to a flange joint assembly for use in a gas turbine engine.

Gas turbine engines typically include an inlet, a fan, low and high pressure compressors, a combustor, and low and high pressure turbines. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as producing useful work to propel an aircraft in flight or to power a load, such as an electrical generator. Each of the compressors, combustor, and turbines include casing that are coupled to adjacent casings a flange joints.

During engine operation, significant heat is produced which raises the temperature of the casings and their respective flanges. However, in at least some known turbine engines, the inner surface of each casing is exposed to different temperatures than the outer surface of the casing such that any joint comprising multiple flanges experiences high thermal gradients within each flange. Such thermal gradients introduce significant tension stresses onto the flanges which in turn decrease the service lifetime of the flanges and, therefore, the casings. Shorter service life (durability) of turbine engine components increases maintenance frequency and associated costs.

BRIEF DESCRIPTION

In one aspect, a flange joint assembly is provided. The flange joint assembly includes a first structure including a first flange and a second structure including a second flange coupled to the first flange to form a joint therebetween. The second flange includes a radially outer surface. The flange joint assembly also includes a compression ring coupled to at least the radially outer surface and configured to apply a compressive force to the radially outer surface to reduce an amount of tension stress within said second flange.

In another aspect, a method assembling a gas turbine engine is provided. The method includes forming a compression ring and coupling the compression ring to a radially outer surface of a first flange of a first structure. The compression ring is coupled to apply a compressive force to the radially outer surface to reduce an amount of tension stress within the first flange. The method also includes coupling the first flange to a second flange of a second structure to form a flange joint assembly.

DETAILED DESCRIPTION

Figure 1:
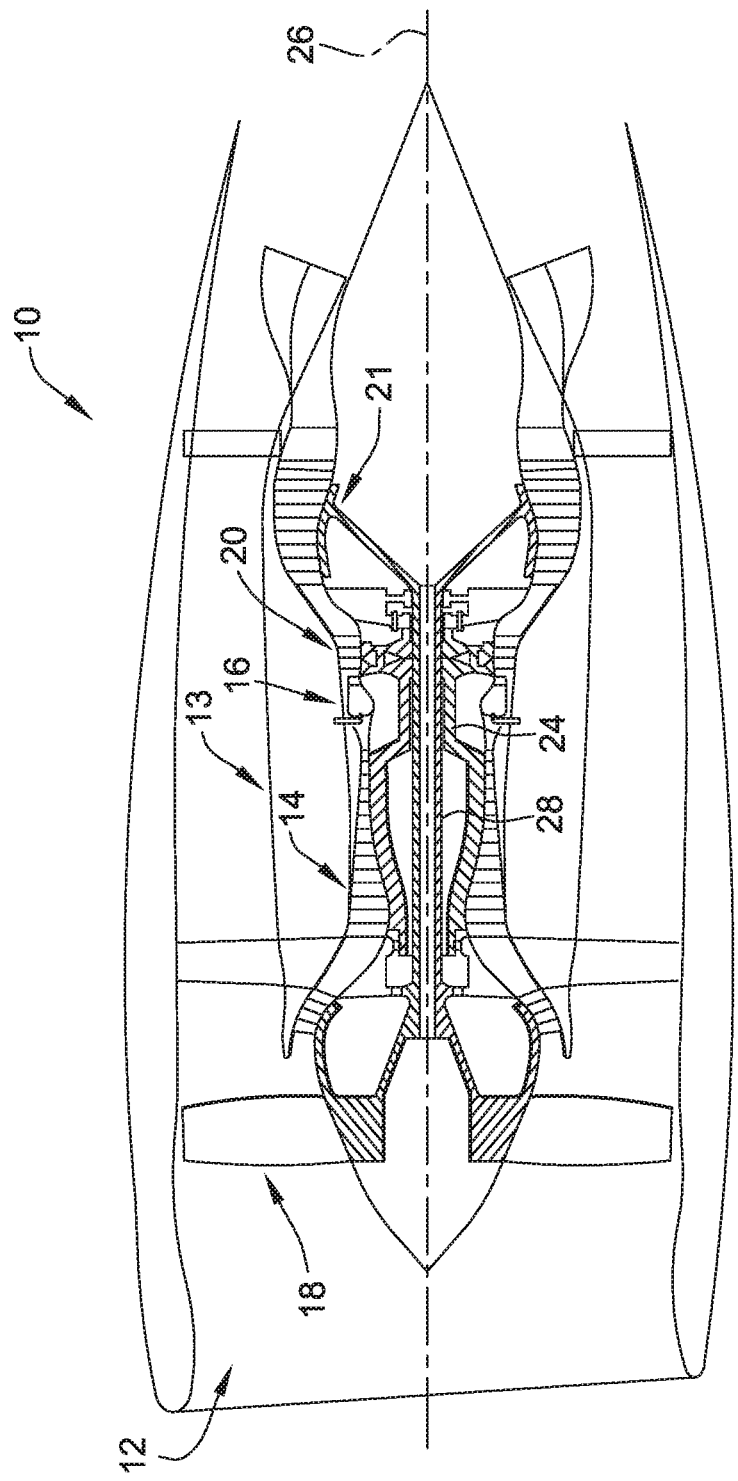
FIG. 1 is a schematic illustration of an exemplary gas turbine engine.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The exemplary assemblies and methods described herein overcome at least some disadvantages of known systems and methods for reducing tension stress in a flange joint on a gas turbine engine. Moreover, the assemblies and methods described herein include a first structure having a first flange and a second structure having a second flange coupled to the first flange to form a joint therebetween. The second flange includes a lip portion that at least partially overlaps the first flange. The flange joint assembly also includes a compression ring coupled to a radially outer surface of the lip portion and configured to apply a compressive force to the lip portion to introduce an amount of pre-stress into the joint. Such a compression pre-stress decreases the operational tension stresses in the flange caused by the thermal gradients therein from the different inner and outer surface temperatures and also facilitates increasing the service lifetime of the flange and the casing overall.

Advantages of the flange joint assembly described herein include introducing a compression pre-stress that allows for a decrease weight of the engine when compared to a flange lip portion thickness increase required to decreases operation stresses to a similar level. The comparative reduction in weight for the same benefit results in a more fuel efficient engine having reduced operational costs. Furthermore, the compression pre-stress increases the service lifetime of the components and, therefore, reduces the costs of engine maintenance and ownership.

The singular forms "a", "an", and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "first", "second", and "third" may be used interchangeably to distinguish one component from another and are not intended to signify location or importance of the individual components. The term "low coefficient of thermal expansion material" refers to a material which grows relatively less as the temperature increases.

As used herein, the terms "axial" and "axially" refer to directions and orientations that extends substantially parallel to a centerline of the turbine engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine outlet, or a component being relatively closer to the engine outlet as compared to another component. Moreover, the terms "radial" and "radially" refer to directions and orientations that extends substantially perpendicular to the centerline of the turbine engine.

All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

Referring initially to FIG. 1, a schematic side section view of a gas turbine engine 10 is shown. The function of the gas turbine engine is to extract energy from high pressure and temperature combustion gases and convert the energy into mechanical energy for work. The gas turbine engine 10 has an engine inlet end 12 wherein air enters a core engine 13 after passing through a fan section 18. Core engine 13 is defined generally by a compressor 14, a combustor 16, a multistage high pressure turbine (HPT) 20, and a separate low pressure turbine (LPT) 21. Collectively, the core engine 13 provides thrust or power during operation. The gas turbine engine 10 may be used for aviation, power generation, industrial, marine or the like.

In operation, air enters through the air inlet end 12 of the engine 10 and moves through at least one stage of compression where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades which in turn cause rotation of the shaft 24 about engine axis 26. The shaft 24 passes toward the front of the engine to continue rotation of the one or more compressor stages 14, a turbofan 18 or inlet fan blades, depending on the turbine design. The turbofan 18 is connected by the shaft 28 to LPT 21 and creates thrust for the turbine engine 10. LPT 21 may also be utilized to extract further energy and power additional compressor stages.

Figure 2:
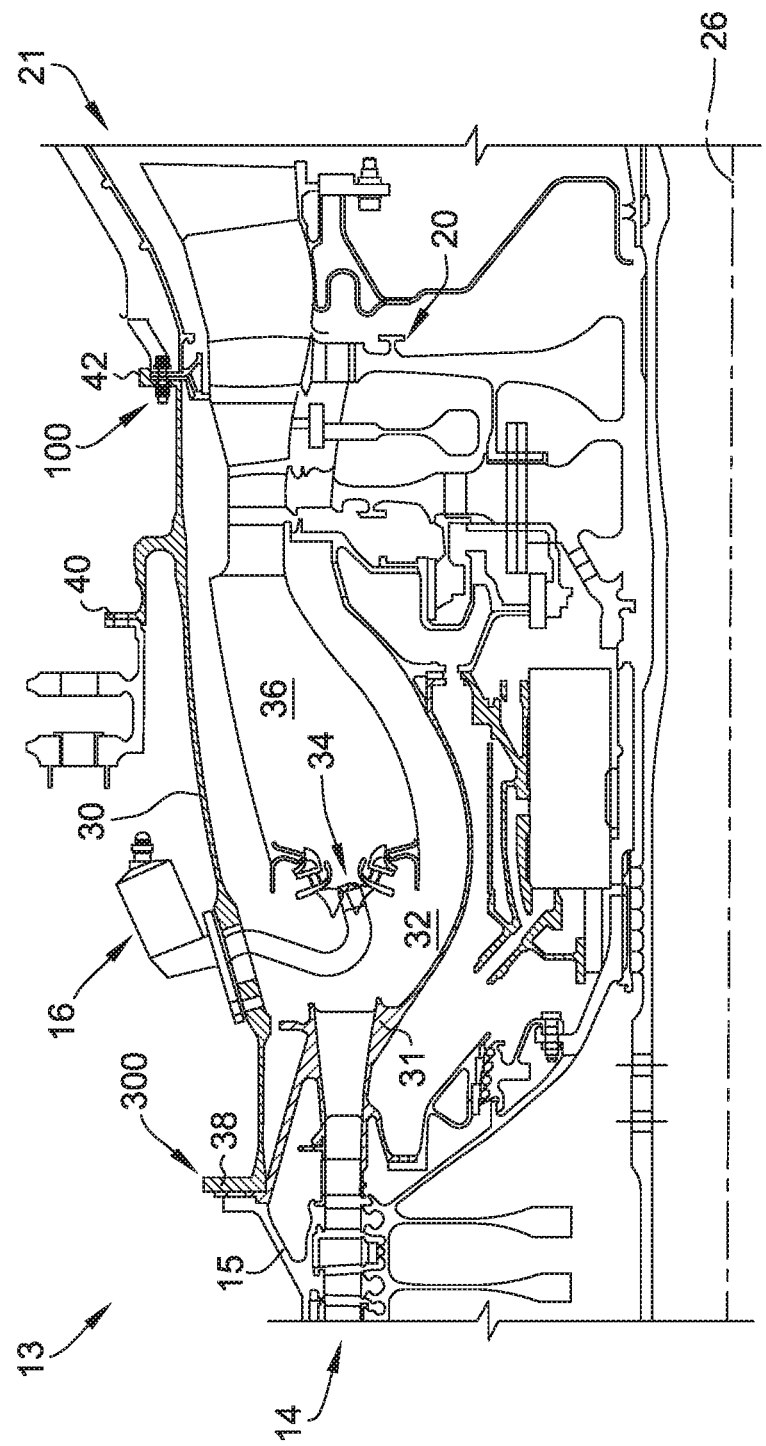
FIG. 2 is a schematic illustration of exemplary core engine that may be utilized with the gas turbine engine shown in FIG. 1 illustrating an exemplary flange joint assembly.

FIG. 2 is a schematic illustration of a portion of core engine 13 illustrating an exemplary flange joint assembly 100 and an alternative flange joint assembly 300. More specifically, FIG. 2 illustrates the interface between compressor 14, combustor 16, high pressure turbine 20, and low pressure turbine 21. In the exemplary embodiment, combustor 16 includes a combustor case 30 and diffuser 31 that combine to partially define a plenum 32 for housing a fuel injector 34 and combustion chamber 36 therein. Combustor case 30 includes a forward flange 38 coupled to a casing 15 of compressor 14, an intermediate flange 40 coupled to another combustor component, and an aft flange 42 coupled to high pressure turbine 20 and low pressure turbine 21. In the exemplary embodiment, core engine 13 includes flange joint assembly 100 at aft flange 42 of combustor casing 30. Alternatively, flange joint assembly 300 is located forward flange 38 and include forward flange 38, diffuser 31, and compressor casing 15. Generally, as described in further detail below, flange joint assemblies 100 and 300 are positioned at any location having a joint formed between two components coupled together at respective flanges. In the exemplary embodiment, flange joint assemblies 100 and 300 apply a compressive force that generates a radial compression pre-stress on aft flange 42 or forward flange 38 to facilitate increasing the service lifetime of aft flange 42 or forward flange 38 and combustor casing 30. Alternatively, flange joint assemblies 100 and 300 increase the service lifetime of any component, and is not limited to use with flanges 38 and/or 42 of combustor casing 30.

Figure 3:
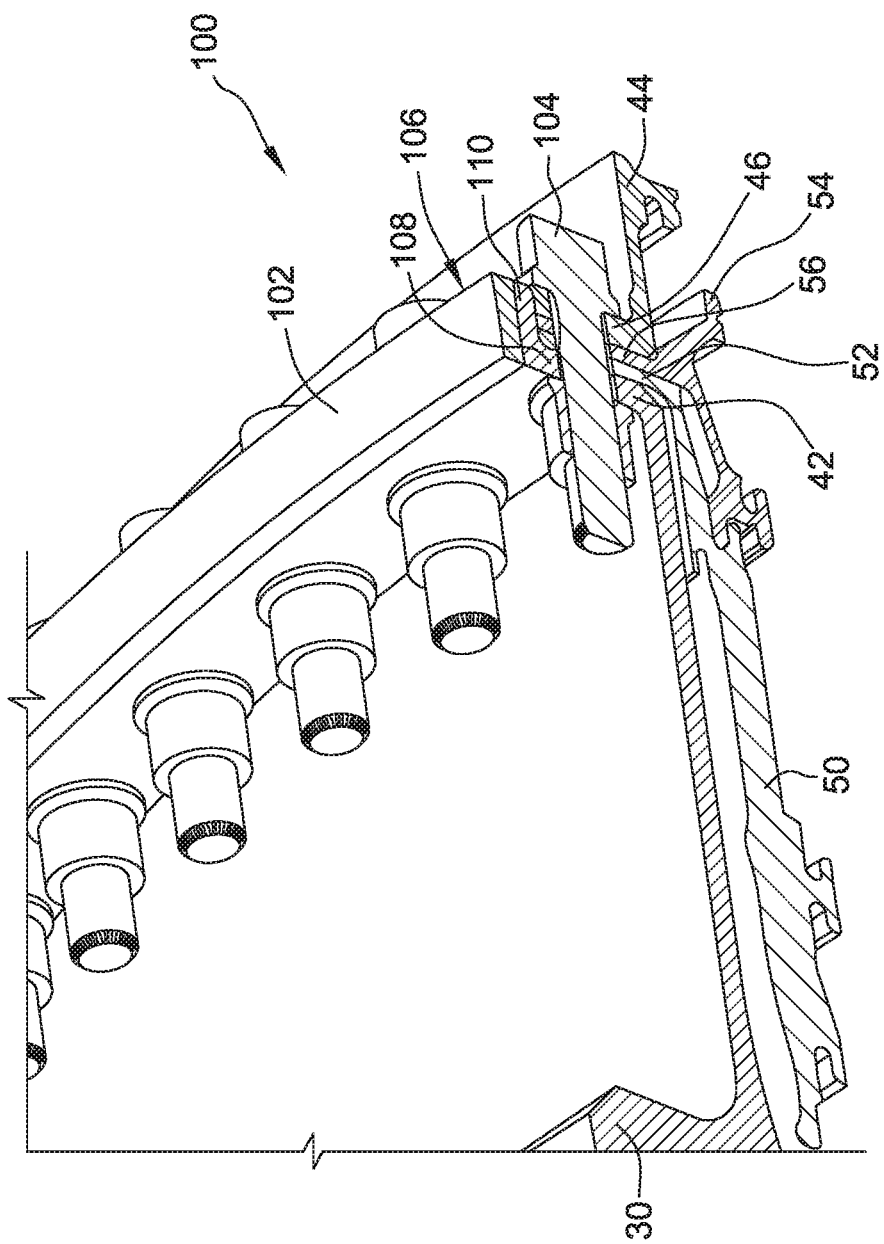
FIG. 3 is an enlarged perspective view of the flange joint assembly shown in FIG. 2.
Figure 4:
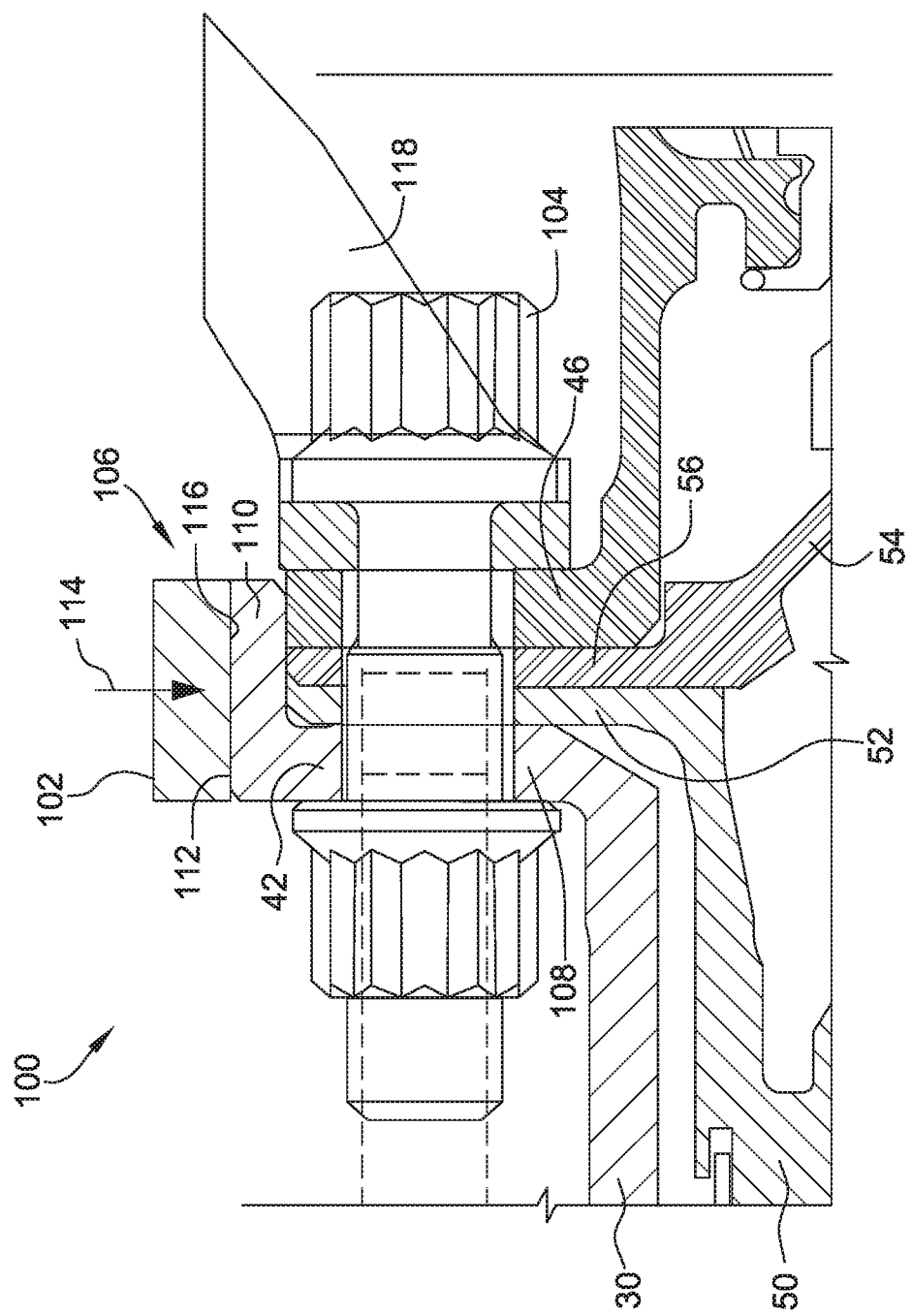
FIG. 4 is an enlarged side view of the flange joint assembly shown in FIG. 2.

FIG. 3 is an enlarged perspective view of flange joint assembly 100 and FIG. 4 is an enlarged side view of flange joint assembly 100 shown in FIG. 2. In the exemplary embodiment, flange joint assembly 100 includes a LPT case 44 having a first flange 46, combustor case 30 having aft or second flange 42, a HPT case 50 having a third flange 52, a support shroud 54 having a fourth flange 56, and a compression ring 102. HPT case 50 and support shroud are positioned radially inward of combustor case 30 and LPT case 44. In the exemplary embodiment, flanges 46, 42, 52, and 56 and ring 102 are coupled together with a plurality of circumferentially-spaced fasteners 104 to form a joint 106. More specifically, each of flanges 46, 42, 52, and 56 include an aligned opening through which fastener 106 is inserted to coupled flanges 46, 42, 52, and 56 together. First flange 46 is positioned most aft and second flange 42 positioned most forward such that third and fourth flanges 52 and 56 are coupled therebetween.

In the exemplary embodiment, second flange 42 includes a radial portion 108 and an axial lip portion 110 extending from a distal end of radial portion 108. Radial portion 108 is substantially parallel with flanges 46, 52, and 56, while lip portion 110 extends in an axial direction to at least partially overlap each of flanges 46, 52, and 56. Lip portion 110 facilitates concentrically aligning flanges 46, 52, and 56 to control gaps between casings 30, 44, 50, and 54 and rotating blades (not shown) positioned radially inward thereof. However, as described above, joint 106 is subject to high thermal gradients because of the temperature differences between the radially inner and outer portions of flanges 46, 42, 52, and 56. Such thermal gradients induce undesired tension stresses on joint 106, and more specifically, on flanges 46, 42, 52, and 56 where fasteners 104 are located.

Accordingly, in the exemplary embodiment, flange joint assembly 100 includes compression ring 102 coupled to a radially outer surface 112 of lip portion 110. As described in further detail below, compression ring 102 applies a radial compressive force, represented by arrow 114, on radially outer surface 112 that introduces a compression pre-stress onto joint 106. Such a compression pre-stress decreases the operational tension stresses in flanges 46, 42, 52, and 56 caused by the thermal gradients therein from the differing temperatures of the inner and outer portions of each flange 46, 42, 52, and 56 and also facilitates increasing the service lifetime of flanges 46, 42, 52, and 56 and casings 30, 44, 50, and 54 overall. Alternatively, compression ring 102 increases the service lifetime of any component within engine 10 about which it is coupled and is not limited to use with aft flange 42 of combustor casing 30.

In the exemplary embodiment, compression ring 102 is of a unitary or one piece circumferential structure and may have various cross-sectional shapes. For example, according to the illustrated embodiment, the cross-section of compression ring 102 is generally rectangular and may have curved or sharp corners. Alternatively, compression ring 102 includes any cross-sectional shape that facilitates operation of flange joint assembly as described herein.

In the exemplary embodiment, compression ring is formed from a first material having a predetermined coefficient of thermal expansion (CTE). For example, compression ring 102 is manufactured from stainless steel, a nickel-based super alloy, or ceramic matrix composite material. Alternatively, compression ring 102 comprises any high-strength material that resists high temperatures and severe mechanical stress while exhibiting high surface stability. Flange 42, and therefore lip portion 110, is formed from a different material having a predetermined CTE that is greater than the CTE of compression ring 102. During operation, lip portion 110 reaches its CTE temperature before compression ring 102 and attempts to expand into compression ring 102. However, compression ring 102 limits radial thermal expansion of lip portion 110 and facilitates applying compressive force 114 on radially outer surface 114 to introduce a pre-stress and reduce tension stresses in flanges 46, 42, 52, and 56 caused by thermal gradients. Alternatively, lip portion 110 and compression ring 102 are formed from the same material and are coupled together by an interference fit that applies force 114 to lip portion 110, as described in further detail below.

Furthermore, in the exemplary embodiment, compression ring 102 is coupled to lip portion 110 via an interference fit to facilitate applying compressive force 114 on radially out surface 112. More specifically, compression ring 102 includes a radially inner surface 116 that defines a first inner diameter when compression ring 102 is at a non-operational temperature and a second inner diameter when compression ring 102 is at an operational temperature. Further, radially outer surface 112 of lip portion 110 defines a radially outer diameter that is between the first and second diameters of compression ring. The interference fit between lip portion 110 and compression ring 102 occurs due the different CTEs. More specifically, compression ring 102 may be heated to expand its diameter to the second, larger diameter and positioned on lip portion 110. As compression ring 102 cools, the diameter of compression ring decreases towards the first diameter, which is smaller than the radially outer diameter of lip portion 110. According, as compression ring 102 cools, compressive force 114 is applied to radially outer surface 112 by radially inner surface 116. In the exemplary embodiment, the interference fit, that is, the difference between the first diameter of compression ring 102 and the radially outer diameter of lip portion 110, is approximately within a range of 0.001 inch (in.) to 0.015 in. More specifically, the difference between the first diameter of compression ring 102 and the radially outer diameter of lip portion 110 is approximately within a range of 0.005 in. to 0.008 in. Alternatively, the interference fit is any distance that facilitates operation of flange joint assembly 100 as described herein.

As shown in FIG. 4, flange joint assembly 100 also includes a plurality of brackets 118 coupled to first flange 46 and/or to second flange 42. Brackets 118 are coupled to flanges 42 and 46 to prevent axial movement of compression ring 102 during operation. In one embodiment, brackets 118 are separate components attached to either or both of flanges 42 and 46.

Figure 5:
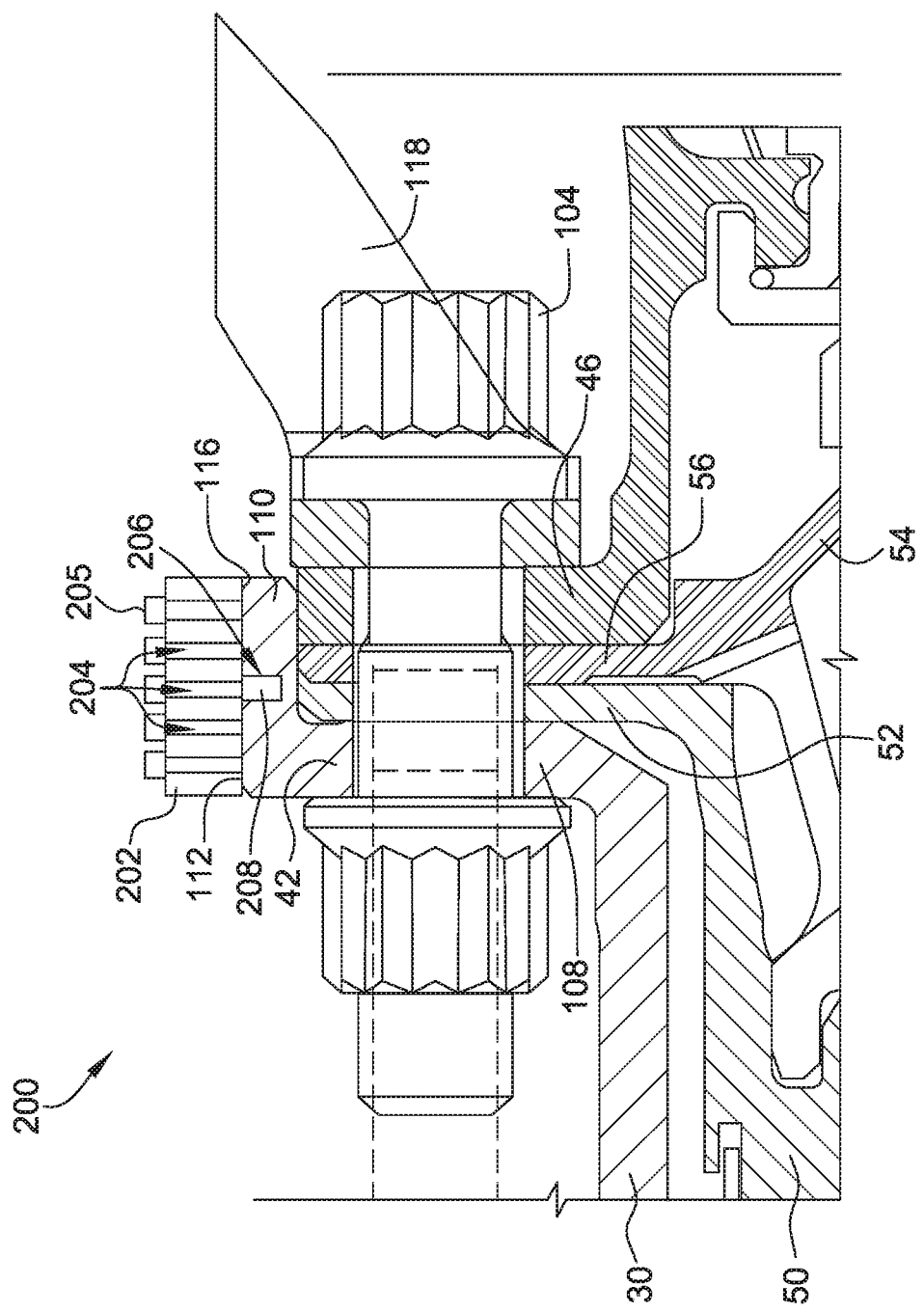
FIG. 5 is an enlarged side view of an alternative flange joint assembly.

FIG. 5 is an enlarged side view of an alternative flange joint assembly 200 including an alternative compression ring 202. Like components in flange joint assemblies 100 and 200 are labeled with identical reference numbers in FIGS. 4 and 5. In one embodiment, compression ring 202 includes a plurality of cooling channels 204 defined therethrough to facilitate cooling compression ring 202. Although FIG. 5 illustrates cooling channels 204 as being radially oriented, cooling channels 204 may also be axially oriented. Cooling channels 204 are exposed to a cooling airflow (not shown) that facilitate reducing the temperature of compression ring 202. When the temperature of compression ring 202 decreases, the radially inner diameter of compression ring 202 decreases proportionally such that compression ring 202 exert additional force 114 on lip portion 110. That is, cooling channels 204 facilitate increasing the amount of compressive force 114 on lip portion 110 by reducing the temperature and diameter of compression ring 202.

Additionally, compression ring 202 includes a plurality of fins 205 extending from a radially outer surface of ring 202. Fins 205 increase the surface area of the outer portion of ring 202 to facilitate cooling compression ring 202. In one embodiment, ring 202 includes both cooling channels 204 and fins 205. In another embodiment, ring 202 includes only one of cooling channels 204 and fins 205.

In flange joint assembly 200, lip portion 110 includes a groove 206 defined in radially outer surface 112. Compression ring 202 includes a complementary-shaped projection 208 that is sized for insertion into groove 206 in lip portion. Groove 206 and projection 208 serve to orient compression ring 202 and to aid in assembly and in preventing axial movement of compression ring 202. Groove 206 and projection 208 may be used in combination with or in place of plurality of brackets 118.

Figure 6:
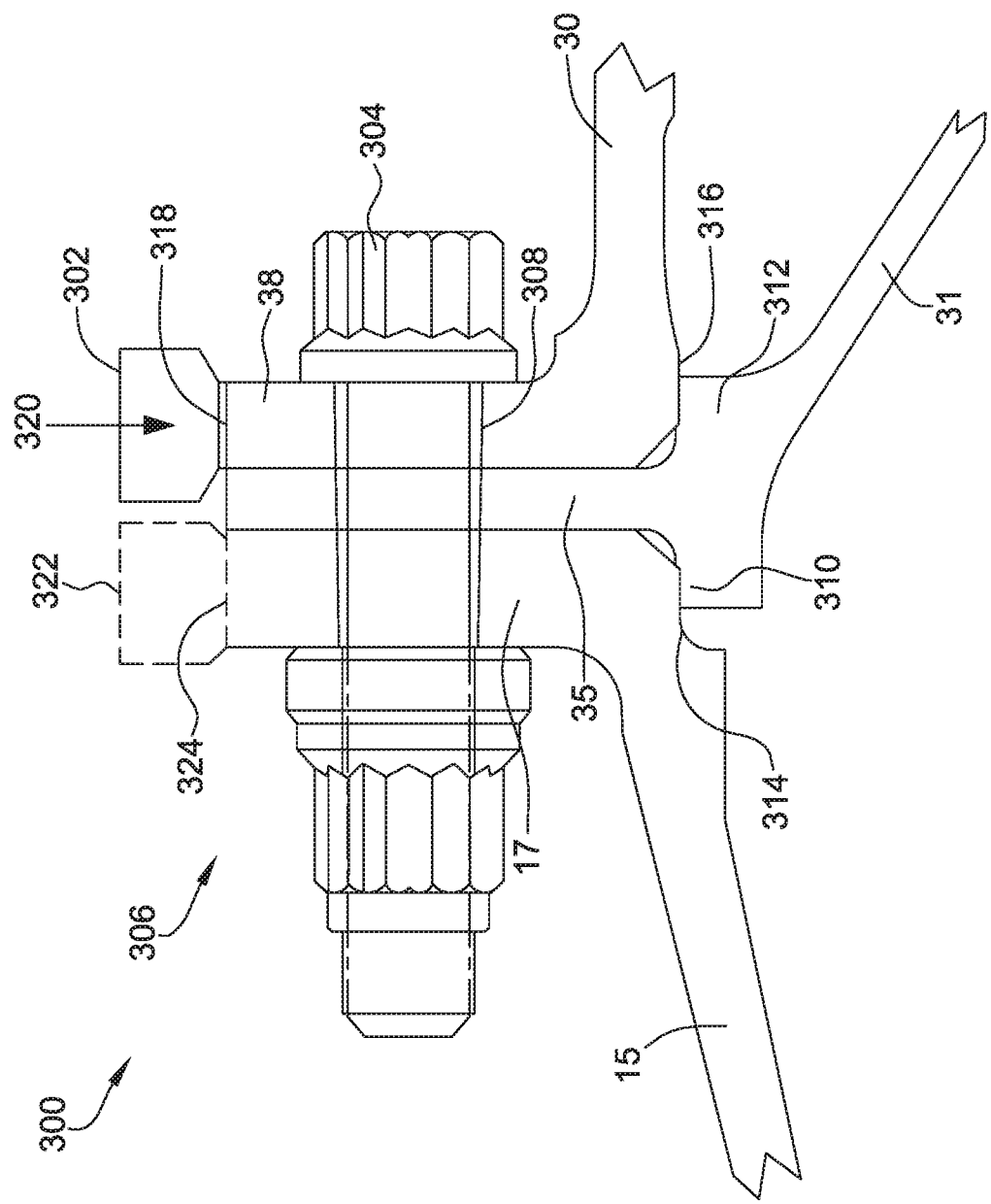
FIG. 6 is an enlarged side view of another alternative flange joint assembly.

FIG. 6 is an enlarged side view of alternative flange joint assembly 300 shown in FIG. 2. Flange joint assembly 300 includes compressor case 15 having a first flange 17, combustor case 30 having forward or second flange 38, diffuser 31 having a third flange 35, and a compression ring 302. In one embodiment, flanges 17, 35, and 38 and ring 302 are coupled together with a plurality of circumferentially-spaced fasteners 304 to form a joint 306. More specifically, each of flanges 17, 35, and 38 include an aligned opening 308 through which fastener 304 is inserted to couple flanges 17, 35, and 38 together. First flange 17 is positioned most forward and second flange 38 positioned most aft such that third flange 35 is coupled therebetween.

As shown in FIG. 6, diffuser 31 includes a first lip portion 310 coupled to an inner surface 314 of compressor case 15 and a second lip portion 312 coupled to an inner surface 316 of combustor casing 30. Lip portions 310 and 312 facilitate concentrically aligning flanges 17, 35, and 38 to control gaps between casings 15, 31, and 30 and rotating blades (not shown) positioned radially inward thereof. However, as described above, joint 306 is subject to high thermal gradients because of the temperature differences between the radially inner and outer portions of flanges 17, 35, and 38. Such thermal gradients induce undesired tension stresses on joint 306, and more specifically, on flanges 17, 35, and 38 where fasteners 304 are located.

Accordingly, in the exemplary embodiment, flange joint assembly 300 includes compression ring 302 coupled to a radially outer surface 318 of second flange 38. As described in further detail herein, compression ring 302 applies a radial compressive force, represented by arrow 320, on radially outer surface 318 that decreases the operational tension stresses in flange 38 caused by the thermal gradients therein from the differing temperatures of the inner and outer portions of flange 38 and also facilitates increasing the service lifetime of flange 38 and casing 30 overall. Alternatively, compression ring 302 increases the service lifetime of any component within engine 10 about which it is coupled and is not limited to use with forward flange 38 of combustor casing 30. Optionally, flange joint assembly 300 also includes a second compression ring 322 coupled about a radially outer surface 324 of first flange 17. Compression rings 302 and 322 are substantially similar in function. In one embodiment, flange joint assembly 300 includes a single compression ring 302 that extends axially over each flange 38, 35, and 17 or multiple compression rings 302 and 322 that are coupled about any of flanges 38, 35, and 17. Compression rings 302 and 322 are formed from the same materials and in the same manner as compression ring 102 and flange joint assembly 300 is assembled using substantially similar methods as flange assembly 100, so such materials and methods are not repeated herein with respect to flange joint assembly 300 for clarity.

Figure 7:
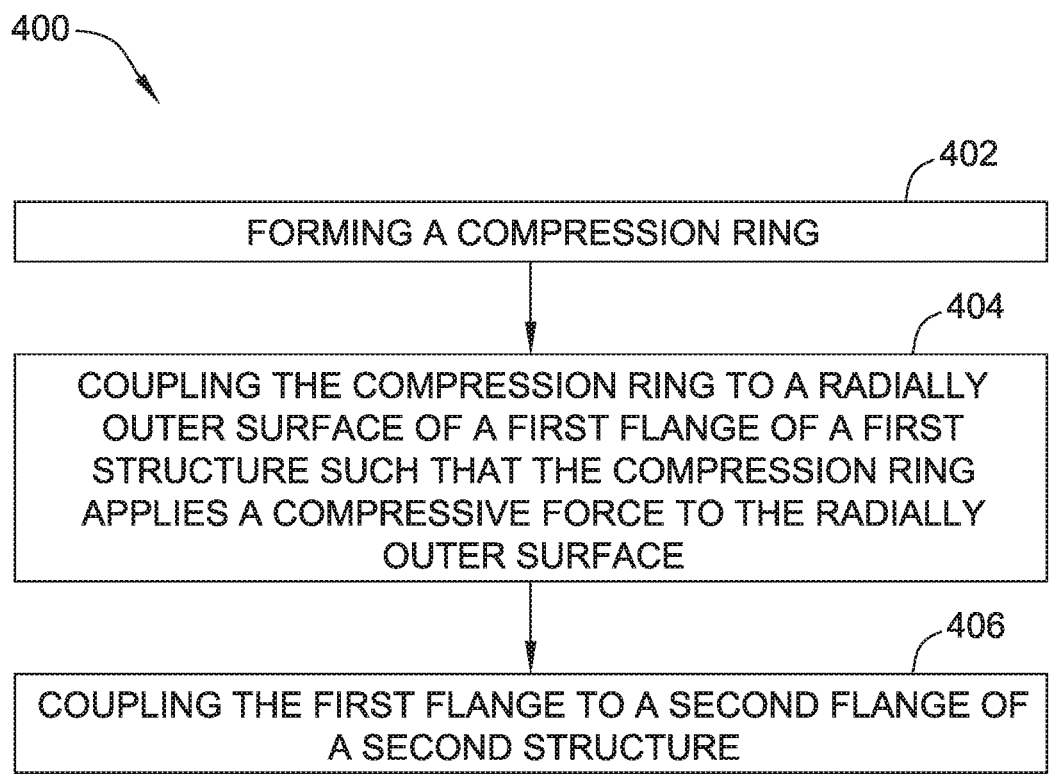
FIG. 7 is a schematic diagram of a method of assembling the gas turbine engine shown in FIG. 1.

FIG. 7 is a schematic diagram of a method 400 of assembling the gas turbine engine shown in FIG. 1. Method 400 includes forming 402_compression ring 102. Forming 402 compression ring 102 includes forming compression ring from a material such as, but not limited to, stainless steel, nickel-based super alloy, and CMC such that compression ring 102 has a CTE lower than the CTE of the material from which second flange 42 and lip portion 110 are formed. In one embodiment, forming 402 compression ring 102 includes fabricating compression ring as a solid, unitary or one-piece, continuous or seamless member forged or machined in a closed loop shape from a solid material ingot. In another embodiment, forming 402 compression ring 102 includes bonding together, such as by welding, opposing ends of a strip of material to form a closed loop shape. Alternatively, compression ring 102 is formed by any method, such as but not limited to sheet metal stamping and forming, that facilitates operation of method 300 as described herein. Furthermore, forming 402 compression ring 202 includes forming 402 at least one of cooling channels 204 therethrough and/or forming 304 protrusion 208 extending from radially inner surface 116 of compression ring 202 such that protrusion 208 is configured for insertion into groove 206 defined in radially outer surface 112 of lip portion 110.

In the exemplary embodiment, method 400 also includes coupling 404 compression ring 102 to radially outer surface 112 of lip portion 110 such that compression ring 102 applies compressive force 114 to radially outer surface 112. Coupling 404 includes coupling 404 compression ring 102 to lip portion 110 via an interference fit. In one embodiment, coupling 404 includes heating compression ring 102 such that the first inner diameter of compression ring 102, which is smaller than an outer diameter of lip portion 110, increases to a second inner diameter that is larger than the outer diameter of lip portion 110. Coupling 404 further includes positioning compression ring 102 about lip portion 110 and cooling compression ring 102 to cause compression ring 102 to decrease in size from the second inner diameter to an operational diameter substantially similar to the outer diameter of lip portion 110. As compression ring 102 cools, it shrinks in diameter and seats itself circumferentially onto lip portion 110. At ambient temperature, due to the smaller diameter of inner surface 116 of compression ring 102 compared to the outer diameter of outer surface 112 of lip portion 110, an interference fit is formed. The interference fit results in radial compressive circumferential force 114 being applied to lip portion 110 by compression ring 102.

In another embodiment, coupling 404 includes cooling combustor case 30 with liquid nitrogen or other means, to a predetermined temperature such that a first outer diameter of lip portion 110, which is larger than an inner diameter of compression ring 102, decreases to a second outer diameter that is smaller than the inner diameter of compression ring 102. Coupling 404 further includes positioning compression ring 102 about lip portion 110 and heating combustor case 30 to cause lip portion 110 to increase in size from the second outer diameter to an operational diameter substantially similar to the inner diameter of compression ring 110. As combustor case 30 expands, compression ring 110 limits the amount of combustor case 30 expansion such that compression ring 102 applies compressive force 114 to radially outer surface 112 of lip portion 110. Furthermore, method 400 includes any combination of heating and cooling compression ring 102 and combustor case 30 that enables operation of flange joint assembly 100 as described herein. Additionally, method 400 includes coupling 406 the first flange to the second flange 42 to form flange joint assembly 100

In another embodiment, as described above, the interference fit may be introduced through using force to press fit compression ring 102 onto lip portion 110 or wrap fit compression ring 102 around lip portion 110 before bonding the compression ring 102 ends without applying heating or cooling to change size.

The exemplary assemblies and methods described herein overcome at least some disadvantages of known systems and methods for reducing tension stress in a flange joint on a gas turbine engine. Moreover, the assemblies and methods described herein include a first structure having a first flange and a second structure having a second flange coupled to the first flange to form a joint therebetween. The second flange includes a lip portion that at least partially overlaps the first flange. The flange joint assembly also includes a compression ring coupled to a radially outer surface of the lip portion and configured to apply a compressive force to the lip portion to introduce an amount of pre-stress into the joint. Such a compression pre-stress decreases the operational tension stresses in the flanges caused by the thermal gradients therein from the differing temperatures of the inner and outer portions of each flange and also facilitates increasing the service lifetime of the flanges and the casings overall.

A technical effect of the above described flange joint assembly is that introducing compression pre-stress allows for a decrease weight of the engine when compared to a flange lip portion thickness increase required to decreases operation stresses to a similar level. The comparative reduction in weight for the same benefit results in a more fuel efficient engine having reduced operational costs. Furthermore, the compression pre-stress increases the service lifetime of the components and, therefore, reduces the costs of engine maintenance and ownership.

Exemplary embodiments of flange joint assemblies are described above in detail. The flange joint assemblies, and methods of assembling such assemblies and devices are not limited to the specific embodiments described herein, but rather, components of systems and/or steps of the methods may be utilized independently and separately from other components and/or steps described herein. For example, the assemblies may also be used in combination with other systems having flange joints, and are not limited to practice with only the turbine engines as described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A flange joint assembly comprising:
    a first structure comprising a first flange;
    a second structure comprising a second flange coupled to the first flange to form a joint therebetween, wherein the second flange comprises a radial portion extending substantially parallel to and abutting the first flange and a lip portion extending axially from the radial portion, the lip portion including a radially outer surface; and
    a compression ring coupled to at least the radially outer surface, the compression ring applying a radial compressive force to the radially outer surface to reduce an amount of tension stress within the second flange, wherein the compression ring comprises a radially inner surface defining a first inner diameter when the compression ring is at a non-operational temperature and a second inner diameter when the compression ring is at an operational temperature, the radially outer surface defining a radially outer diameter that is greater than the first inner diameter and less than the second inner diameter.

2. The flange joint assembly in accordance with claim 1, wherein the compression ring comprises a first material having a first coefficient of thermal expansion, and wherein the second flange comprises a second material having a second coefficient of thermal expansion greater than the first coefficient of thermal expansion.

3. The flange joint assembly in accordance with claim 1, wherein the compression ring comprises at least one of ceramic matric composite (CMC) and stainless steel.

4. The flange joint assembly in accordance with claim 1, wherein the compression ring is coupled to the radially outer surface via an interference fit such that the compression ring applies the radial compressive force to the radially outer surface to introduce an amount of pre-stress into the joint.

5. The flange joint assembly in accordance with claim 1, wherein a difference between the radially outer diameter and the first inner diameter is approximately 0.001 inch to 0.015 inch.

6. The flange joint assembly in accordance with claim 1, wherein the first structure comprises a turbine casing for a gas turbine engine and the second structure comprises a combustor casing for the gas turbine engine.

7. The flange joint assembly in accordance with claim 1, wherein the lip portion at least partially overlaps an outer radial surface of the first flange, the compression ring coupled to the radially outer surface of the lip portion.

8. The flange joint assembly in accordance with claim 1, further comprising a plurality of brackets coupled to at least one of the first and the second flanges, the plurality of brackets configured to prevent axial movement of the compression ring.

9. The flange joint assembly in accordance with claim 1, wherein the compression ring comprises at least one of a cooling channel defined therethrough and a projection formed on the radially inner surface of the compression ring, wherein the lip portion comprises a groove configured to receive the projection therein.

10. A method of assembling a gas turbine engine, the method comprising:
    providing a first structure comprising a first flange;
    providing a second structure comprising a second flange, wherein the second flange comprises a radial portion extending substantially parallel to and abutting the first flange and a lip portion extending axially from the radial portion, the lip portion including_a radially outer surface;
    coupling the second flange to the first flange to form a joint therebetween;
    coupling a compression ring to at least the radially outer surface of the lip portion by:
        heating the compression ring such that a first inner diameter of the compression ring, which is smaller than an outer diameter of the radially outer surface, increases to a second inner diameter that is larger than the outer diameter of the radially outer surface;
        positioning the compression ring about the radially outer surface; and
        cooling the compression ring to cause the compression ring to decrease in size from the second inner diameter to an operational diameter substantially similar to the outer diameter of the radially outer surface such that the compression ring applies a compressive force to the radially outer surface thereby applying a radial compressive force with the compression ring to the radially outer surface and reducing an amount of tension stress within the second flange and coupling thereby coupling the first structure to the second structure.

11. The method according to claim 10, further comprising the step of forming the compression ring from a first material having a first coefficient of thermal expansion less than a second coefficient of thermal expansion of the second flange.

12. The method according to claim 10, further comprising the step of forming the compression ring from at least one of ceramic matric composite (CMC) and stainless steel.

13. The method according to claim 10, wherein coupling the first structure to the second structure comprises coupling a turbine casing to a combustor casing in the gas turbine engine.

14. The method according to claim 10, wherein coupling the compression ring to a radially outer surface of a first flange of a first structure comprises coupling the compression ring to a radially outer surface of a lip portion of the first flange that at least partially overlaps the second flange.

15. The method according to claim 10, wherein forming the compression ring comprises forming at least one cooling channel therethrough and forming a protrusion extending from a radially inner surface of the compression ring, wherein the protrusion is configured for insertion into a groove defined in the radially outer surface.

16. The method according to claim 10, wherein forming the compression ring comprises at least one of welding together opposing ends of a strip of material to form the compression ring and machining the compression ring a solid material ingot.

\* \* \* \* \*